(12) United States Patent
Zhu et al.

(10) Patent No.: US 10,848,865 B2
(45) Date of Patent: Nov. 24, 2020

(54) METHOD AND DEVICE FOR SOUND SOURCE POSITIONING USING MICROPHONE ARRAY

(71) Applicant: Goertek Inc., Weifang, Shandong Province (CN)

(72) Inventors: Jian Zhu, Weifang (CN); Xiangdong Zhang, Weifang (CN); Zhiping Luo, Weifang (CN); Dong Yan, Weifang (CN); Zhuo Chen, Weifang (CN)

(73) Assignee: Weifang Goertek Microelectronics Co., Ltd., Shandong Province (CN)

( * ) Notice: Subject to any disclaimer, the term of this patent is extended or adjusted under 35 U.S.C. 154(b) by 27 days.

(21) Appl. No.: 15/780,168

(22) PCT Filed: Dec. 8, 2017

(86) PCT No.: PCT/CN2017/115232
§ 371 (c)(1),
(2) Date: May 30, 2018

(87) PCT Pub. No.: WO2018/223639
PCT Pub. Date: Dec. 13, 2018

(65) Prior Publication Data
US 2019/0364358 A1 Nov. 28, 2019

(30) Foreign Application Priority Data

Jun. 6, 2017 (CN) .......................... 2017 1 0417074

(51) Int. Cl.
*H04R 3/00* (2006.01)
*G01S 5/20* (2006.01)
*H04R 1/40* (2006.01)

(52) U.S. Cl.
CPC ................ *H04R 3/005* (2013.01); *G01S 5/20* (2013.01); *H04R 1/406* (2013.01); *H04R 2201/401* (2013.01)

(58) Field of Classification Search
CPC ....... H04S 2400/11; H04R 3/005; H04R 1/32; H04R 1/326; H04R 1/406;
(Continued)

(56) References Cited

U.S. PATENT DOCUMENTS 6,970,796 B2 11/2005 Tashev
7,817,805 B1 * 10/2010 Griffin .................... G01S 3/807
367/103

(Continued)

FOREIGN PATENT DOCUMENTS

CN 1664609 A 9/2005
CN 1952684 A 4/2007
(Continued)

OTHER PUBLICATIONS

International Search Report issued in International Patent Application No. PCT/CN2017/115232 dated Mar. 14, 2018.
(Continued)

*Primary Examiner* — Leshui Zhang
(74) *Attorney, Agent, or Firm* — Arent Fox LLP

(57) ABSTRACT

A method and device for sound source positioning using a microphone array. The method comprises: determining a horizontal axis that a microphone array rotates around as a reference axis; calculating, according to a sound emitted by a sound source that is collected by the microphone array, to obtain a first sound source estimated value indicating a sound source position in a three-dimensional space; acquiring an inclination angle between a plane in which the microphone array is located when it is rotating and a horizontal plane in which the reference axis is located; and
(Continued)

according to the first sound source estimated value and the inclination angle, calculating out a second sound source estimated value on a horizontal plane corresponding to the first sound source estimated value, and using the second sound source estimated value as the determined sound source position.

8 Claims, 3 Drawing Sheets

(58) Field of Classification Search
CPC ........ H04R 2201/401; H04R 2201/403; H04R 2201/405; G01S 5/18; G01S 5/20; G01S 5/22; G01S 5/24; G01S 5/26; G01S 5/28; G01S 5/30; G06F 3/16; G06F 3/162; G06F 3/165; G06F 3/167; G06F 16/60; G06F 16/61; G06F 16/632; G06F 16/634; G06F 16/635; G06F 16/636; G06F 16/637; G06F 16/638; G06F 16/639; G06F 16/64
USPC ..... 381/17, 26, 56, 57, 58, 91, 92, 122, 111, 381/112, 113, 114, 115; 700/94
See application file for complete search history.

(56) References Cited

U.S. PATENT DOCUMENTS

| | | | | |
|---|---|---|---|---|
| 2003/0185410 | A1* | 10/2003 | June ...................... | H04R 1/406 381/94.1 |
| 2005/0192768 | A1 | 9/2005 | Tashev | |
| 2009/0310444 | A1* | 12/2009 | Hiroe ................... | G01S 3/8006 367/125 |
| 2011/0019836 | A1* | 1/2011 | Ishibashi ................ | H04R 1/406 381/92 |
| 2011/0110531 | A1* | 5/2011 | Klefenz .................. | G01S 3/809 381/92 |
| 2015/0063069 | A1* | 3/2015 | Nakadai .................. | G01S 3/802 367/118 |

FOREIGN PATENT DOCUMENTS

| | | |
|---|---|---|
| CN | 102305925 A | 1/2012 |
| CN | 103675803 A | 3/2014 |
| CN | 103791905 A | 5/2014 |
| CN | 104360315 A | 2/2015 |
| CN | 104459625 A | 3/2015 |
| CN | 106291469 A | 1/2017 |
| CN | 107422305 A | 12/2017 |
| EP | 1571461 A1 | 9/2005 |
| JP | 2005249789 A | 9/2005 |
| JP | 3962063 B2 | 8/2007 |
| JP | 2012247300 A | 12/2012 |
| JP | 5412470 A | 2/2014 |
| KR | 20060043339 A | 5/2006 |

OTHER PUBLICATIONS

International Written Opinion issued in International Patent Application No. PCT/CN2017/115232 dated Mar. 14, 2018.
China First Office Action corresponding to Chinese Application No. 2017104170749, dated, Apr. 23, 2019.
China Search Report corresponding to Chinese Application No. 2017104170749, dated Apr. 12, 2019.
Jie, Shi, "Vector array based underwater noise source near-field high resolution localization identification method", China doctoral thesis full-text data project, Science and Techonology II, Feb. 15, 2011 (English translation).

* cited by examiner ated value, and using the second sound source estimated value as the determined sound source position.

According to another aspect of the present disclosure, there is provided a device for sound source positioning using a microphone array, wherein the device comprises:

an axis determining module, for determining a horizontal axis that a microphone array rotates around as a reference axis;

an angle acquiring module, for acquiring an inclination angle between a plane in which the microphone array is located when it is rotating and a horizontal plane in which the reference axis is located;

a first calculating module, for calculating, according to a sound emitted by a sound source that is collected by the microphone array, to obtain a first sound source estimated value indicating a sound source position in a three-dimensional space; and a second calculating module, for, according to the first sound source estimated value and the inclination angle, calculating out a second sound source estimated value on a horizontal plane corresponding to the first sound source estimated value, and using the second sound source estimated value as the determined sound source position.

The advantageous effects of the present disclosure are as follows. According to the present disclosure, first, a first sound source estimated value indicating a sound source position in a three-dimensional space is obtained by calculating, according to a sound emitted by a sound source that is collected by the microphone array; then, in order to prevent the positioning error caused by the estimation of the sound source when the microphone array is inclining, an inclination angle between a plane in which the microphone array is located when it is rotating and a horizontal plane in which the reference axis is located is acquired; and a second sound source estimated value on a horizontal plane corresponding to the first sound source estimated value is calculated out according to the first sound source estimated value and the inclination angle. Thereby, the demand of sound source positioning when the microphone array is inclining is satisfied, while the positioning error of sound source in the inclined state of the microphone array is prevented, and the accuracy of sound source positioning is improved. In addition, because the sound source can be accurately positioned even when the microphone array is inclining, the design limitation of products having a microphone array in the prior art that the microphone array is required to be horizontally placed is broken through, which greatly improves the design flexibility and attractiveness level of product, provides more design options for the microphone array of product, and improves the market competitiveness of product.

METHOD AND DEVICE FOR SOUND SOURCE POSITIONING USING MICROPHONE ARRAY

CROSS-REFERENCE TO RELATED APPLICATION

This application is a National Stage entry of International Application No. PCT/CN2017/115232, filed on Dec. 8, 2017, which claims priority to Chinese Patent Application No. 201710417074.9, filed on Jun. 6, 2017. The disclosure of the priority applications are hereby incorporated in their entirety by reference.

TECHNICAL FIELD

The present disclosure relates to the technical field of acoustic signal processing, and particularly relates to a method and device for sound source positioning using a microphone array.

BACKGROUND

With the progress of electronic information and acoustic technologies as well as the development of smart hardware products such as robots, sound source positioning techniques based on microphone arrays are increasingly applied in smart products such as robots. A microphone array is an array of a group of microphones located at different positions in the space and arranged according to a certain shape and rule, and is used for collecting and processing space-transmitted sound signals. Sound source positioning techniques are the basis of other sound source processing techniques, and only if the position and the horizontal angle of a sound source are determined by sound source positioning techniques, the subsequent tasks such as beam forming, sound source tracking, voice noise reduction and echo elimination can be conducted. If the position angle of the sound source positioned deviates from the actual sound source position, the effectiveness of the subsequent voice processing will be greatly reduced. Therefore, it is a challenge that a person skilled in the art faces to reduce the error of sound source positioning and improve the accuracy of sound source positioning.

SUMMARY

The present disclosure provides a method and device for sound source positioning using a microphone array which can effectively reduce the error of sound source positioning and improve the accuracy of sound source positioning.

According to an aspect of the present disclosure, there is provided a method for sound source positioning using a microphone array, wherein the method comprises the steps of:

determining a horizontal axis that a microphone array rotates around as a reference axis;

acquiring an inclination angle between a plane in which the microphone array is located when it is rotating and a horizontal plane in which the reference axis is located;

calculating, according to a sound emitted by a sound source that is collected by the microphone array, to obtain a first sound source estimated value indicating a sound source position in a three-dimensional space; and according to the first sound source estimated value and the inclination angle, calculating out a second sound source estimated value on a horizontal plane corresponding to the first sound source

DETAILED DESCRIPTION

Figure 1:
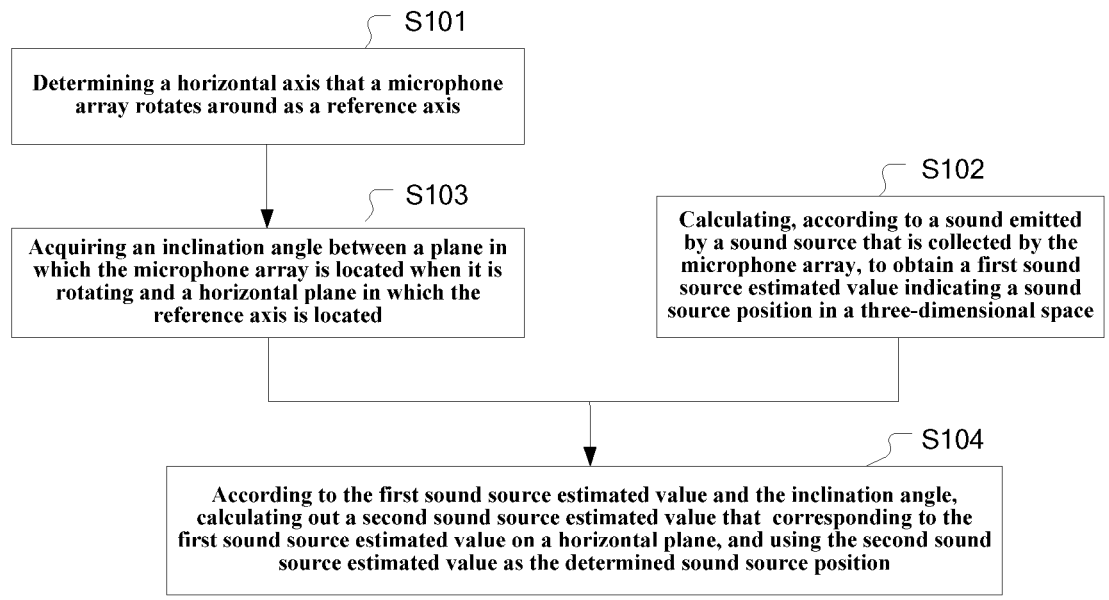
FIG. 1 is a flow chart of a method for sound source positioning using a microphone array in accordance with the present disclosure.

The sound source positioning algorithms are implemented by a microphone array consisting of a plurality of microphones. The most common form of microphone array is that four (or more) microphones are evenly distributed on a circle. Presently, the microphone arrays and most sound source positioning techniques require that, in hardware design, the microphone array is horizontally placed, because only when all of the microphones in the microphone array are in the same horizontal plane, the error between the position obtained by the sound source positioning algorithm and the actual sound source position can be reduced to a minimum.

The design concept of the present disclosure is as follows. Regarding the problem of the prior art that the sound source positioning techniques based on microphone arrays all require the microphones of the microphone array to be located in the same horizontal plane, which cannot satisfy the demands of some products, a technical solution for sound source positioning using a microphone array is proposed. According to the technical solution of the present disclosure, first, a first sound source estimated value in the three-dimensional space is obtained by using the microphone array; then, according to an acquired inclination angle between the plane in which the microphone array is located when the it is inclining and the horizontal plane in which the reference axis is located, the mapping of the first sound source estimated value on the horizontal plane, namely, the second sound source position, is calculated out, thereby satisfying the demands of the products in which the microphones of the microphone array cannot be located in the same horizontal plane, reducing the error between the positioned sound source position and the actual sound source position when the microphone array is inclining, and improving the market competitiveness of product.

In order to facilitate the understanding of the present disclosure, the principle of sound source positioning based on a microphone array is briefly described herein.

Presently, there are mainly three methods for sound source positioning based on a microphone array. The first method positions a sound source using Time-Delay estimator technique and Delay Sum Beamformer technique. The Time-Delay estimator and Delay Sum Beamformer techniques have relatively low positioning accuracy, so they have very limited use in three-dimensional positioning and so on. The second method positions a sound source using Maximum Likelihood Estimation generic algorithm and High Order Estimation generic algorithm. This method is very complicated and needs a large amount of calculation, so it is usually used in theoretical research only. The third method positions a sound source using near field sound source positioning technique. Specifically, first, a microphone array is formed by arranging a plurality of microphones according to a certain topological structure, for example, 6 omnidirectional microphones are uniformly distributed on a circle of a diameter of 40 centimeters to form a circular microphone array, to pick up the sound signal emitted by the sound source and all other voice signals within the receiving range of the microphones; then the signals received by each of the microphones are subject to a series of processing such as analog-to-digital conversion, windowing and spectral subtraction; finally, the incidence position angle of the sound source to the microphone array is calculated out, namely, the position and direction of the sound source is judged.

The above microphone array-based sound source positioning techniques all require that all microphones of the microphone array be on the same horizontal plane, to reduce the error between the sound source positioning result and the actual value to a minimum. However, in practice, some products cannot ensure that all microphones are in the same horizontal plane. For example, in service robot products, typically, the microphone array is provided at the head of service robot. However, the head of service robot is often in a moving state, such as head lifting and head dropping, thus it cannot be ensured that all microphones in the microphone array are in the same horizontal plane; in other words, the microphone array may incline. When the microphone array rotates, the inclination angle between the plane in which the microphone array is located when it is rotating and the horizontal plane in which the reference axis is located will increase, thus the error of the position angle of the positioned sound source will be relatively larger.

The inventors of the present disclosure find that, none of the conventional sound source positioning techniques considers the situation of an inclining microphone array, and the positioning accuracy can be ensured only when the microphone array is used in a completely horizontal state. The non-horizontal state of the microphone array affects the measurement result of the microphone array to a certain extent. The measuring error varies with the inclination angle; when the sound source positioning result is 0 degree or 90 degrees, there is no influence (because they are perpendicular projection); when the sound source positioning result is about 45 degrees, the influence is relatively large, and the error (namely, the difference between the positioned angle and the actual angle of the sound source) is as large as about 20 degrees. Considering that the pick-up distance of the microphone array is approximately 5 meters, the difference of the distance to the object caused by the angle difference of 20 degrees is as large as about 1.5 meters, which is unacceptable.

In order to solve the above technical problems, the present disclosure provides a method for sound source positioning using a microphone array. Referring to FIG. 1, the method comprises the following steps:

Step S101, determining a horizontal axis that a microphone array rotates around as a reference axis;

Step S103, acquiring an inclination angle between a plane in which the microphone array is located when it is rotating and a horizontal plane in which the reference axis is located;

Step S102, calculating, according to a sound emitted by a sound source that is collected by the microphone array, to obtain a first sound source estimated value indicating a sound source position in a three-dimensional space; and Step S104, according to the first sound source estimated value and the inclination angle, calculating out a second sound source estimated value on a horizontal plane, wherein the second sound source estimated value corresponds to the first sound source estimated value, and using the second sound source estimated value as the determined sound source position.

The order of Step S102 and Step S103 is not fixed. Step S102 may precede Step S103, and alternatively, Step S103 may precede Step S102, which is not limited in the present disclosure. In practical applications, Step S101 and Step S103 need to be executed in advance only once, and when the sound source is positioned using a microphone array, Step S101 and Step S103 need not to be executed again, while Step S102 and Step S104 must be executed every time.

It can be known from FIG. 1 that, the method for sound source positioning using a microphone array of the present disclosure, calculates out the sound source position angle in the three-dimensional space according to the sound signal collected by the microphone array, then according to the acquired inclination angle of the microphone array, calculates the sound source position angle within the horizontal plane corresponding to the position angle of the sound source in the three-dimensional space after the microphone array is projected onto the horizontal plane, thereby obtaining the horizontal sound source position angle, which satisfies the practical demands, reduces the error between the sound source positioning result and the actual sound source position (experiments confirm that, if the technical solution of the present disclosure is used, even when the microphone array seriously inclines, the positioning error of the sound source position angle is reduced from 20 degrees to 3 degrees), and greatly improves the accuracy of sound source positioning.

As calculating, according to a sound emitted by a sound source that is collected by the microphone array to obtain a first sound source estimated value indicating a sound source position in a three-dimensional space, it can be realized by using the prior art (such as the sound source positioning techniques based on steered beamformer, time difference of arrival or high resolution spectrum estimation). The present embodiment, by referring to FIGS. 2 to 4, explains how to calculate out a second sound source estimated value on a horizontal plane corresponding to the first sound source estimated value according to the first sound source estimated value and the inclination angle.

The embodiments of the present disclosure are described by taking the common circular microphone array as the example of the microphone array. As introduced above, the circular microphone array consists of a plurality of microphones that are evenly distributed on a circle. In order to better judge the inclined state of the microphone array, the present embodiment defines a horizontal axis which a microphone array rotates around as a reference axis, and the reference axis always maintains a completely horizontal state. When the microphone array is inclined, no matter how the inclining angle changes, its inclined state can always be judged by the same horizontal reference basis in the microphone array.

Figure 2:
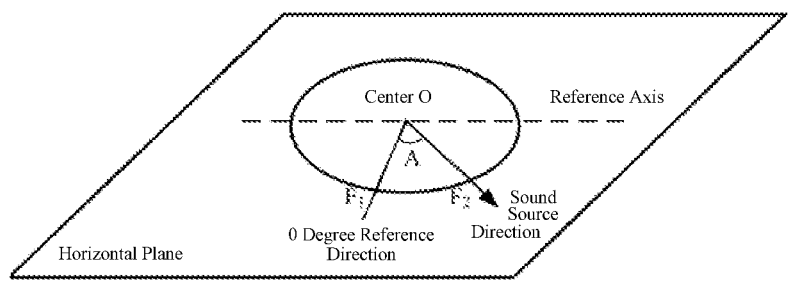
FIG. 2 is a schematic diagram of a positioning model of microphone array in the non-inclined state in accordance with the present disclosure.

Referring to FIG. 2, the reference axis is the dotted line. FIG. 2 shows that when the microphone array is not rotating, all microphones of the microphone array (the microphones distributed on the circle in FIG. 2) are located in the same horizontal plane. In FIG. 2, 0 is the circle center of the circular microphone array, the radius $OF_1$ indicates the 0 degree reference direction of sound source positioning, the radius $OF_2$ indicates the direction of sound source, and the included angle A between the radius $OF_1$ and the radius $OF_2$ is the first sound source estimated value calculated out according to the sound signal collected by the microphone array.

It can be seen from FIG. 2 that, when the microphone array is not rotating, the inclination angle between the plane in which the microphone array is located and the horizontal plane in which the reference axis is located is 0 degree.

After the reference axis is determined, an inclination angle between a plane in which the microphone array is located when it is rotating and a horizontal plane in which the reference axis is located is acquired. In practice, the microphone array will probably rotate. When the microphone array is rotating, there will be a certain included angle, namely, an inclination angle, between the plane in which the microphone array is located when it is rotating and the horizontal plane. If there is an inclination angle there will be a relatively large error between the first sound source estimated value (namely, the sound source position angle) calculated out based on sound signals collected by the microphone array and the actual sound source position, so it is required to be optimized to improve the accuracy of the sound source positioning.

The present embodiment provides two modes of acquiring the inclination angle of the microphone array. The first mode is acquiring a constant angle value. In practical applications, the microphone arrays of some products are designed to keep a constant inclined state with a pitch angle. With respect to such a case, acquiring the inclination angle of the microphone array is acquiring a constant angle value, for example an angle B. The second mode is acquiring a changing inclination angle between a plane in which the microphone array is located when it is rotating and a horizontal plane in which the reference axis is located in real time by using a sensor. Such a mode is with respect to the products with changing inclination angles, for example, service robots. The head of service robot can move and the angle of head lifting may be different, and correspondingly, the inclination angles of the microphone array are different. The present embodiment collects the head movement of service robot in real time by using the sensor provided on the head of service robot, and thus determines the inclination angle of the microphone array.

The sensor herein may be a magnetoelectric encoder or a Hall switch. The measuring principle of a Hall switch is similar to that of the magnetoelectric encoder. The magnetoelectric encoder is mounted on products (for example, service robots), and measures the changing angle of a magnetic material by the magnetic reluctance. The change of the angle of the magnetic material will cause the change of reluctance or voltage. The amount of change is amplified by an amplifying circuit, and processed by a signal processing circuit to output a pulse signal or an analog quantity signal, to complete the measuring. In some other products, for example sound equipments, the inclination angle may be measured by a Hall switch.

After the first sound source estimated value and the inclination angle are obtained, a second sound source estimated value on a horizontal plane corresponding to the first sound source estimated value will be calculated out according to the first sound source estimated value and the inclination angle.

When the microphone array consists of a plurality of microphones located in a same plane, a measuring graph is formed according to the plane in which the microphone array is located when it is rotating (or the rotation axis passing through the center of the microphone array) and the first sound source estimated value; then, a projection graph of the measuring graph on the horizontal plane is obtained, and a projection angle corresponding to the first sound source estimated value is calculated by using a geometric position relation between the measuring graph and the projection graph, a side length of the measuring graph, the first sound source estimated value and the inclination angle, to obtain the second sound source estimated value.

Figure 3:
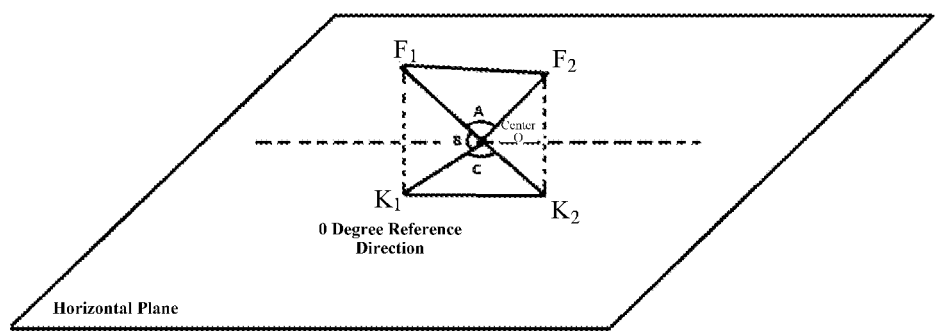
FIG. 3 is a schematic diagram of a positioning model of microphone array in the inclined state in accordance with the present disclosure.

Referring to FIGS. 2 and 3, the step of calculating out a second sound source estimated value on a horizontal plane corresponding to the first sound source estimated value according to the first sound source estimated value and the inclination angle, particularly comprises the following steps.

A measuring graph is formed according to the first sound source estimated value, a first rotation axis and a second rotation axis in the circular microphone array that use a center (namely, the circle center O) of the circular microphone array as a starting point. The first rotation axis (the straight line on which the radius $OF_1$ is located) indicates the 0 degree reference direction of sound source positioning, the second rotation axis (the straight line on which the radius $OF_2$ is located) indicates the positioned sound source direction, and the first sound source estimated value (the angle A) is the included angle between the first rotation axis and the second rotation axis.

As shown in FIG. 3, the measuring graph is a measuring triangle formed by a side $OF_1$ connecting the center (O) of the circular microphone array and an intersection point ($F_1$) between the first rotation axis and a circle of the circular microphone array, a side $OF_2$ connecting the center (O) of the circular microphone array and the intersection point ($F_2$) of the second rotation axis and the circle of the circular microphone array, and a side $F_1F_2$ connecting the two intersection points ($F_1$, $F_2$). Namely, the three sides of the measuring triangle are $OF_1$, $OF_2$ and $F_1F_2$. A projection triangle $OK_1K_2$ is obtained by projecting the measuring triangle $OF_1F_2$ onto the horizontal plane.

Referring to FIG. 3, a projection triangle can be obtained by projecting orthographically and downwardly the measuring triangle in the space onto the horizontal plane. The side obtained by the projecting of the side $OF_1$ is $OK_1$. Since the side $OF_1$ in the measuring triangle indicates the 0 degree reference direction of sound source positioning, the side $OK_1$ obtained by projecting also indicates the 0 degree reference direction of sound source positioning. The side obtained by the projecting of the side $OF_2$ is $OK_2$, and the side obtained by the projecting of the side $F_1F_2$ is $K_1K_2$.

The angle B in FIG. 3 is the acquired inclination angle of the microphone array as stated above, the value of B ranges from negative 90 degrees to positive 90 degrees ("negative" and "positive" represent directions).

The projection angle on the horizontal plane corresponding to the interior angle A of the measuring triangle is the interior angle C of the projection triangle. The sound source position that is mapped to the horizontal plane by the sound source position in the space can be obtained by calculating out the value of the angle C.

Figure 4:
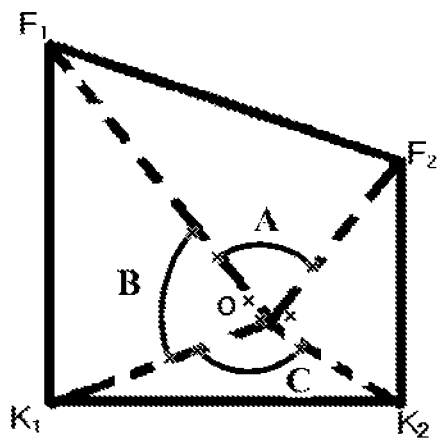
FIG. 4 is a schematic diagram of a pentahedron model that is constructed according to FIG. 3.

After the measuring triangle and the projection triangle are obtained, a pentahedron model can be formed by connecting the measuring triangle and the projection triangle in the three-dimensional space with lines. As shown in FIG. 4, the five planes of the pentahedron model $OF_1F_2K_1K_2$ include: the measuring triangle $OF_1F_2$ located at an upper surface, the projection triangle $OK_1K_2$ located at a lower bottom surface, and two lateral triangles (the first lateral triangle: $OF_1K_1$, and the second lateral triangle: $OF_2K_2$) and a trapezoid ($F_1F_2K_2K_1$) that are obtained by connecting vertexes of the measuring triangle and the projection triangle.

Since $OF_1$ and $OF_2$ are the radiuses of the circular microphone array and already known, the angles A and B can be acquired. Accordingly, the side lengths of the projection triangle can be obtained by geometric calculation, and a value of the projection angle corresponding to the first sound source estimated value can be calculated out according to the side lengths of the projection triangle, thereby the second sound source estimated value can be obtained. In other words, the lengths of the sides $OK_1$, $OK_2$ and $K_1K_2$ can be calculated out using trigonometric function, then the angle C can be obtained using trigonometric function. It should be noted that, in the process of calculating the value of C, the radius R merely serves as an auxiliary parameter for calculating the sides of the triangle including the angle C, and the value of C is only dependent on the angles A and B and is irrelevant to the radius R.

So far, the second sound source estimated value on the horizontal plane corresponding to the first sound source estimated value has been calculated out according to the first sound source estimated value and the inclination angle.

Based on the above calculating process and different demands in practical applications, after obtaining the inclination angle B and the first sound source estimated value, the present disclosure provide two modes to obtain the mapping angle C on the horizontal plane of the sound source position.

The first mode is the real-time calculating mode. As discussed in the above calculating process of the angle C, the second sound source estimated value (namely, the angle C) is calculated out in real time according to the first sound source estimated value and the inclination angle.

Figure 5:
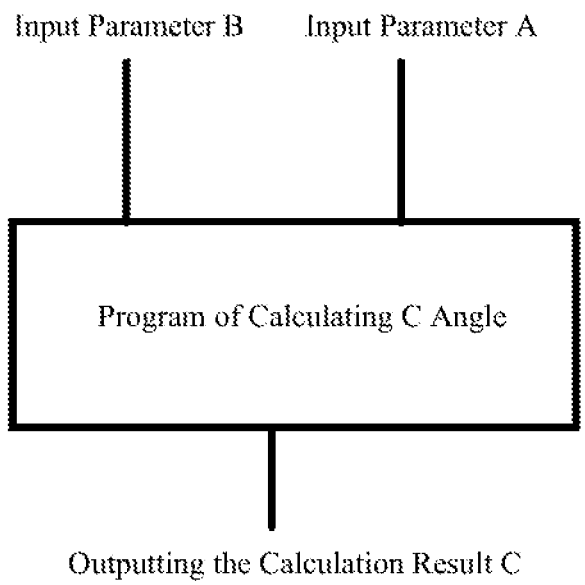
FIG. 5 is a schematic diagram of the principle of calculating the second sound source estimated value in real time in accordance with the present disclosure.

FIG. 5 is a schematic diagram of the principle of obtaining the value of the angle C using the real-time calculating mode in accordance with the present disclosure. As shown in FIG. 5, the acquired angles A and B are input to the program for calculating the angle C executed by the processor as input parameters, namely, input parameters A and B, then the result is output, namely, the calculation result C is output. The program of calculating the angle C is written in advance and corresponds to the above process of calculating the angle C.

Figure 6:
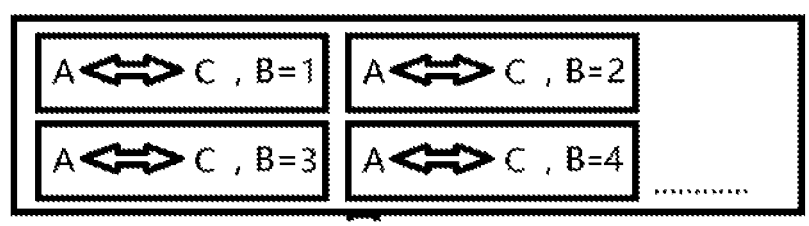
FIG. 6 is a schematic diagram of a correspondence relation database in accordance with the present disclosure.

The second mode is the table looking-up mode. FIG. 6 is a schematic diagram of the correspondence relation database constructed in advance in accordance with the present disclosure. Referring to FIG. 6, it shows, for example, the correspondence relation between the first sound source estimated value A and the projection angle C when the inclination angle B is equal to 1°. It should be noted that, the values of the projection angle C in the correspondence relation database shown in FIG. 6 are calculated out respectively according to the above process of calculating the second sound source estimated value.

Particularly, a correspondence relation database recording correspondence relations between the first sound source estimated value and the second sound source estimated value is constructed according to the first sound source estimated value and preset inclination angles or angle ranges, and according to the matching result between the inclination angle acquired in real time and the preset inclination angles or angle ranges in the correspondence relation database, the second sound source estimated value corresponding to the first sound source estimated value is determined at the matched preset inclination angle or within the matched angle range. Namely, a correspondence relation database between the first sound source estimated value A and the second sound source estimated value C is constructed in advance according to different inclination angles, and a plurality of lists are stored in the correspondence relation database.

When the mapping angle C is needed, the angle C can be obtained by looking up the correspondence relation database according to the angle B and the first sound source estimated value A acquired in real time.

In addition, it should be noted that, FIG. 6 schematically illustrates the correspondence relation database between the first sound source estimated value A and the second sound source estimated value C that is constructed by using each of the inclination angles B as the primary key. However, in practical applications, considering that the difference between the mapping angles corresponding to several inclination angles with a small difference is relatively small, the second sound source estimated value C corresponding to the first sound source estimated value A in an angle range may also be calculated and saved, namely, the angle range is used as the primary key. For example, an angle range [1, 3] is defined to include the cases that the inclination angle is equal to 1 degree, 2 degrees and 3 degrees, the second sound source estimated value C for one of the angles (for example 2 degrees) is calculated and saved as the second sound source estimated value C for the angle range. Namely, the sound source estimated value of one of the angles serves as the representative of the sound source estimated values in the angle range. Thus, when the inclination angle collected in real time is 1 degree and the first sound source estimated value is A, the angle range [1, 3] is matched with the 1 degree and determined as being matched, and the second sound source estimated value C corresponding to the first sound source estimated value A for the angle range [1, 3] is determined as the mapping angle on the horizontal plane.

As discussed above, according to the present disclosure, with respect to the inclining state of the microphone array, the inclined sound source positioning result obtained by the conventional algorithm for sound source positioning using a microphone array is mapped to the horizontal direction by using horizontal mapping, thereby the accuracy of sound source positioning is improved (experiments confirm that, the positioning angle error of the sound source can be reduced from the maximum 20 degrees to 3 degrees). The present disclosure can greatly improve the hardware design of the products, particularly the flexibility of the appearance design. The microphone array in the product is no longer required to be horizontally placed and can be inclined to some extent, thereby the appearance can be more diverse and beautiful, and the market competitiveness of the product is improved.

Figure 7:
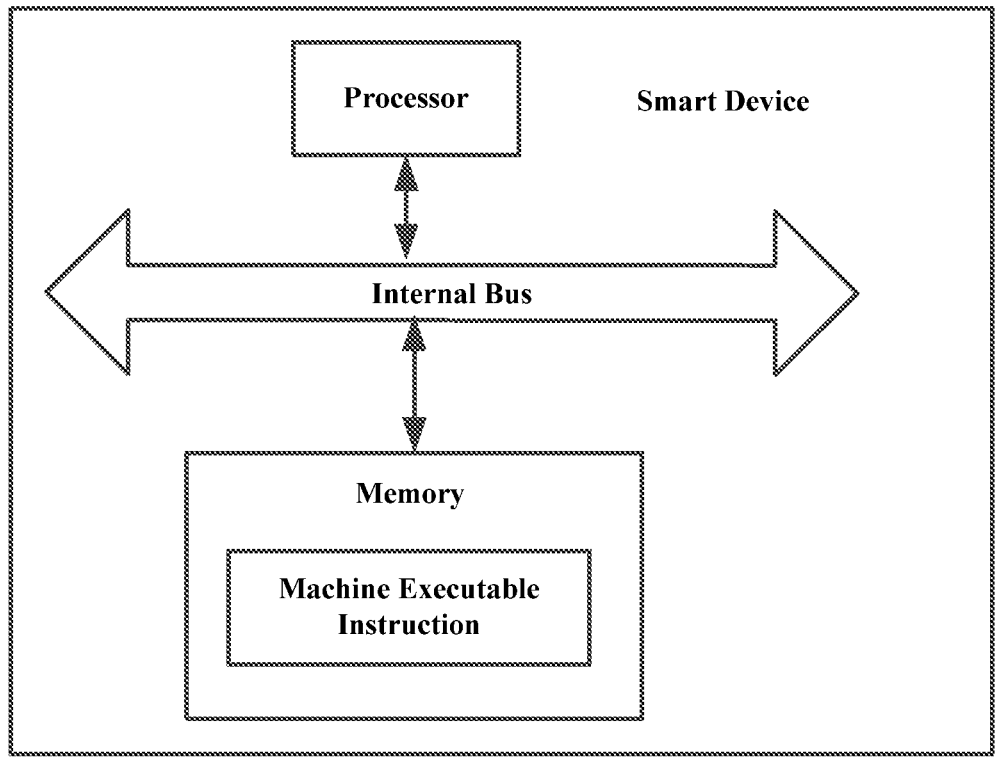
FIG. 7 is a hardware structural diagram of a smart device in accordance with the present disclosure.

Corresponding to the above method, FIG. 7 shows a hardware structural diagram of the smart device in accordance with the present disclosure. Besides the processor and the memory shown in FIG. 7, according to the practical functions of the smart device, the smart device may also comprise other hardware, which is not discussed here in detail. The smart device may be a smart robot, a smart sound equipment, a smart television set and so on.

In FIG. 7, the memory stores machine executable instruction codes. The processor communicates with the memory, and reads and executes the instruction codes stored in the memory, to implement the operations of sound source positioning using a microphone array that are disclosed in the above examples of the present disclosure.

Herein, the memory may be any electronic, magnetic, optical or other physical storage devices, and may contain or store information, such as executable instructions, data and so on. For example, the machine readable storage medium may be RAM (Random Access Memory), a volatile memory, a nonvolatile memory, a flash memory, a storage driver (such as a hard disk drive), a solid state disk, any type of memory discs (such as an optical disk, DVD and so on), or similar storage media, or a combination thereof.

Figure 8:
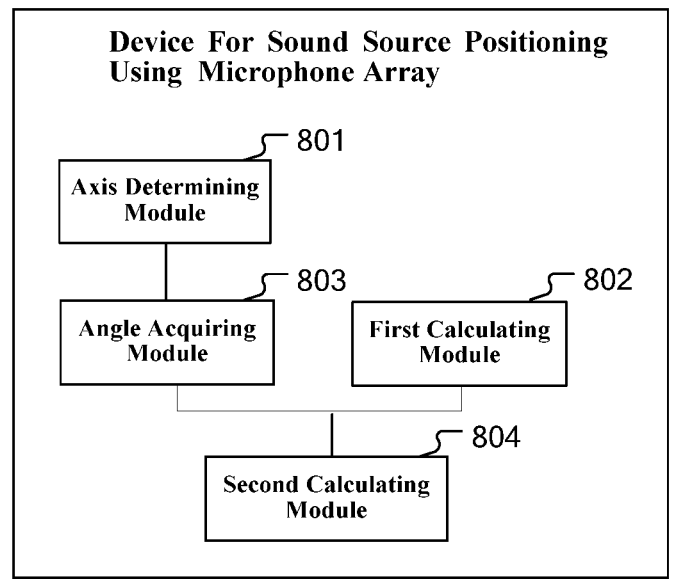
FIG. 8 is a functional block diagram of a device for sound source positioning using a microphone array in accordance with the present disclosure.

Referring to FIG. 8, the present disclosure further provides a device for sound source positioning using a microphone array, comprising:

an axis determining module 801, for determining a horizontal axis that a microphone array rotates around as a reference axis;

an angle acquiring module 803, for acquiring an inclination angle between a plane in which the microphone array is located when it is rotating and a horizontal plane in which the reference axis is located;

a first calculating module 802, for calculating, according to a sound emitted by a sound source that is collected by the microphone array, to obtain a first sound source estimated value indicating a sound source position in a three-dimensional space; and a second calculating module 804, for, according to the first sound source estimated value and the inclination angle, calculating out a second sound source estimated value on a horizontal plane corresponding to the first sound source estimated value, and using the second sound source estimated value as the determined sound source position.

In some embodiments of the present disclosure, the angle acquiring module 803 comprises: a constant angle acquiring module, for acquiring a constant inclination angle between a plane in which the microphone array is located when it is rotating and a horizontal plane in which the reference axis is located; and a changing angle acquiring module, for acquiring in real time a changing inclination angle between a plane in which the microphone array is located when it is rotating and a horizontal plane in which the reference axis is located by using a sensor; and the sensor comprises a magnetoelectric encoder or a Hall switch.

In some embodiments of the present disclosure, the second calculating module 804 comprises a geometric relation constructing module, for, when the microphone array consists of a plurality of microphones located in a same plane, forming a measuring graph according to the plane in which the microphone array is located when it is rotating and the first sound source estimated value; and obtaining a projection graph of the measuring graph on the horizontal plane, and by using a geometric position relation between the measuring graph and the projection graph, a side length of the measuring graph, the first sound source estimated value and the inclination angle, calculating a projection angle corresponding to the first sound source estimated value, to obtain the second sound source estimated value.

In some embodiments of the present disclosure, the microphone array is a circular microphone array consisting of a plurality of microphones located in a same plane, and the geometric relation constructing module is particularly for forming a measuring graph according to the first sound source estimated value, a first rotation axis and a second rotation axis in the circular microphone array that use a center of the circular microphone array as a starting point; wherein the first rotation axis indicates a 0 degree reference direction for sound source positioning, the second rotation axis indicates a direction of the sound source, and the first sound source estimated value is an included angle between the first rotation axis and the second rotation axis; and the measuring graph is a measuring triangle formed by a side connecting the center of the circular microphone array and an intersection point of the first rotation axis and a circle of the circular microphone array, a side connecting the center of the circular microphone array and an intersection point of the second rotation axis and the circle of the circular microphone array, and a side connecting the two intersection points; and projecting the measuring triangle onto the horizontal plane, to obtain a projection triangle; connecting the measuring triangle and the projection triangle with lines in the three-dimensional space, to form a pentahedron model; wherein the five planes of the pentahedron model include: the measuring triangle located at an upper surface, the projection triangle located at a lower bottom surface, and two lateral triangles and a trapezoid that are obtained by connecting vertexes of the measuring triangle and the projection triangle; and obtaining side lengths of the projection triangle by geometric calculation, and calculating out a value of the projection angle corresponding to the first sound source estimated value according to the side lengths, thereby obtaining the second sound source estimated value.

In some embodiments of the present disclosure, the second calculating module 804 comprises: a real-time calculating module, for, according to the first sound source estimated value and the inclination angle, calculating in real time the second sound source estimated value; a table looking-up module, for, according to the first sound source estimated value and preset inclination angles or angle ranges, constructing a correspondence relation database that records correspondence relations between the first sound source estimated value and the second sound source estimated value, and according to a matching result between the inclination angle acquired in real time and the preset inclination angles or angle ranges in the correspondence relation database, determining the second sound source estimated value corresponding to the first sound source estimated value at the matched preset inclination angle or within the matched angle range.

Regarding the device embodiments, as they substantially correspond to the method embodiments, the related parts can refer to the description of the method embodiments. The description of the device embodiments above is merely illustrative, and a person skilled in the art may select part of or all of their modules according to the actual demands to realize the objects of the technical solution of the present embodiment. A person skilled in the art can understand and implement the technical solution without paying creative work.

It should be noted that, in the present disclosure, relation terms such as "first" and "second" are merely used to distinguish one entity or operation from another entity or operation, and they do not necessarily require or imply that these entities or operations actually have such a relation or order. The terms "comprise", "include" or any other variants thereof are intended to cover nonexclusive inclusion, so that processes, methods, articles or devices that comprise a series of elements do not only comprise those elements, but also comprise other elements that are not explicitly listed, or further comprise elements that are intrinsic to such processes, methods, articles or devices. Where there is no further limitation, the statement "comprises a . . . " does not exclude that there exist additional elements of the same kind in the processes, methods, articles or devices that comprise the element.

The above merely describes specific embodiments of the present disclosure. With the teaching of the present disclosure, a person skilled in the art can make other modifications or variations on the basis of the above embodiments. A person skilled in the art should appreciate that, the specific description above is only for the purpose of better explaining the present disclosure, and the protection scope of the present disclosure should be subject to the protection scope of the claims.

What is claimed is:

1. A method for sound source positioning using a microphone array, the method comprises:

determining a horizontal, reference plane for a smart device;

determining a horizontal axis that the microphone array rotates around as a reference axis, the reference axis extending along the horizontal, reference plane always remains completely horizontal relative to the smart device;

rotating a portion of the smart device comprising the microphone array so that a plane on which the microphone array is located rotates around the reference axis to a position at an inclination angle relative to the horizontal, reference plane for the smart device;

acquiring the inclination angle between the plane in which the microphone array is located when it is rotating around the reference axis and the horizontal, reference plane in which the reference axis is located;

collecting a sound emitted by a sound source by the microphone array;

calculating a first sound source estimated value indicating a sound source position in a three-dimensional space according to the collected sound by the microphone array; and according to the first sound source estimated value and the inclination angle, calculating out a second sound source estimated value on the horizontal, reference plane corresponding to the first sound source estimated value, and using the second sound source estimated value as a determined sound source position;

wherein according to the first sound source estimated value and the inclination angle, calculating out the second sound source estimated value on the horizontal, reference plane corresponding to the first sound source estimated value comprises:

when the microphone array consists of a plurality of microphones located in a same plane, forming a measuring graph according to the same plane in which the microphone array is located when it is rotating around the reference axis and the first sound source estimated value; and obtaining a projection graph of the measuring graph on the horizontal, reference plane relative to the smart device, and by using a geometric position relation between the measuring graph and the projection graph, a side length of the measuring graph, the first sound source estimated value and the inclination angle, calculating a projection angle corresponding to the first sound source estimated value, to obtain the second sound source estimated value that is projected onto the horizontal, reference plane relative to the smart device.

2. The method according to claim 1, wherein acquiring the inclination angle between the plane in which the microphone array is located when it is rotating around the reference axis and the horizontal, reference plane in which the reference axis is located comprises:

acquiring a constant inclination angle between the plane in which the microphone array is located when it is rotating around the reference axis and the horizontal, reference plane in which the reference axis is located;

or, acquiring in real time a changing inclination angle between the plane in which the microphone array is located when it is rotating around the reference axis and the horizontal, reference plane in which the reference axis is located by using a sensor, wherein the sensor comprises a magnetoelectric encoder or a Hall switch.

3. The method according to claim 1, wherein the microphone array is a circular microphone array consisting of the plurality of microphones located in the same plane on the portion of the smart device that rotates relative to the horizontal, reference plane for the smart device, and according to the first sound source estimated value and the inclination angle, calculating out the second sound source estimated value on the horizontal, reference plane corresponding to the first sound source estimated value comprises:

forming the measuring graph according to the first sound source estimated value, a first rotation axis and a second rotation axis in the circular microphone array, wherein a center of the circular microphone array is a starting point of the first rotation axis and the second rotation axis;

wherein the first rotation axis indicates a 0 degree reference direction of sound source positioning, the second rotation axis indicates a direction of the sound source, and the first sound source estimated value is an included angle between the first rotation axis and the second rotation axis; and wherein the measuring graph is a measuring triangle formed by a side connecting the center of the circular microphone array and an intersection point of the first rotation axis and a circle of the circular microphone array, a side connecting the center of the circular microphone array and an intersection point of the second rotation axis and the circle of the circular microphone array, and a side connecting the two intersection points;

projecting the measuring triangle onto the horizontal, reference plane, to obtain a projection triangle;

connecting the measuring triangle and the projection triangle with lines in the three-dimensional space, to form a pentahedron model;

wherein the five planes of the pentahedron model include: the measuring triangle located at an upper surface, the projection triangle located at a lower bottom surface, and two lateral triangles and a trapezoid that are obtained by connecting vertexes of the measuring triangle and the projection triangle; and obtaining side lengths of the projection triangle by geometric calculation, and calculating out a value of the projection angle corresponding to the first sound source estimated value according to the side lengths, thereby obtaining the second sound source estimated value.

4. The method according to claim 1, wherein according to the first sound source estimated value and the inclination angle, calculating out the second sound source estimated value on the horizontal, reference plane corresponding to the first sound source estimated value comprises:

according to the first sound source estimated value and the inclination angle, calculating in real time the second sound source estimated value;

or, according to the first sound source estimated value and preset inclination angles or angle ranges, constructing a correspondence relation database that records correspondence relations between the first sound source estimated value and the second sound source estimated value, and according to a matching result between the inclination angle acquired in real time and the preset inclination angles or angle ranges in the correspondence relation database, determining the second sound source estimated value corresponding to the first sound source estimated value at the matched preset inclination angle or within the matched angle range.

5. A smart device, the smart device comprises a processor and a memory, the memory stores a machine executable instruction code, and the processor communicates with the memory, and reads and executes the instruction code stored in the memory, to realize a method for sound source positioning using a microphone array, wherein the method comprises:

determining a horizontal, reference plane for the smart device;

determining a horizontal axis that the microphone array rotates around as a reference axis, the reference axis extending along the horizontal, reference plane always remains completely horizontal relative to the smart device;

rotating a portion of the smart device comprising the microphone array so that a plane on which the microphone array is located rotates around the reference axis to a position at an inclination angle relative to the horizontal reference plane for the smart device;

acquiring the inclination angle between the plane in which the microphone array is located when it is rotating around the reference axis and the horizontal plane in which the reference axis is located;

collecting a sound emitted by a sound source by the microphone array;

calculating a first sound source estimated value indicating a sound source position in a three-dimensional space according to the collected sound by the microphone array; and according to the first sound source estimated value and the inclination angle, calculating out a second sound source estimated value on the horizontal plane corresponding to the first sound source estimated value, and using the second sound source estimated value as a determined sound source position;

wherein according to the first sound source estimated value and the inclination angle, calculating out the second sound source estimated value on the horizontal, reference plane corresponding to the first sound source estimated value comprises:

when the microphone array consists of a plurality of microphones located in a same plane, forming a measuring graph according to the same plane in which the microphone array is located when it is rotating around the reference axis and the first sound source estimated value; and obtaining a projection graph of the measuring graph on the horizontal, reference plane relative to the smart device, and by using a geometric position relation between the measuring graph and the projection graph, a side length of the measuring graph, the first sound source estimated value and the inclination angle, calculating a projection angle corresponding to the first sound source estimated value, to obtain the second sound source estimated value that is projected onto the horizontal, reference plane relative to the smart device.

6. The smart device according to claim 5, wherein acquiring the inclination angle between the plane in which the microphone array is located when it is rotating around the reference axis and the horizontal, reference plane in which the reference axis is located comprises:

acquiring a constant inclination angle between the plane in which the microphone array is located when it is rotating around the reference axis and the horizontal, reference plane in which the reference axis is located;

or, acquiring in real time a changing inclination angle between the plane in which the microphone array is located when it is rotating around the reference axis and the horizontal, reference plane in which the reference axis is located by using a sensor, wherein the sensor comprises a magnetoelectric encoder or a Hall switch.

7. The smart device according to claim 5, wherein the microphone array is a circular microphone array consisting of the plurality of microphones located in the same plane on the portion of the smart device that rotates relative to the horizontal, reference plane for the smart device, and according to the first sound source estimated value and the inclination angle, calculating out the second sound source estimated value on the horizontal, reference plane corresponding to the first sound source estimated value comprises:

forming the measuring graph according to the first sound source estimated value, a first rotation axis and a second rotation axis in the circular microphone array, wherein a center of the circular microphone array is a starting point of the first rotation axis and the second rotation axis;

wherein the first rotation axis indicates a 0 degree reference direction of sound source positioning, the second rotation axis indicates a direction of the sound source, and the first sound source estimated value is an included angle between the first rotation axis and the second rotation axis; and wherein the measuring graph is a measuring triangle formed by a side connecting the center of the circular microphone array and an intersection point of the first rotation axis and a circle of the circular microphone array, a side connecting the center of the circular microphone array and an intersection point of the second rotation axis and the circle of the circular microphone array, and a side connecting the two intersection points;

projecting the measuring triangle onto the horizontal, reference plane, to obtain a projection triangle;

connecting the measuring triangle and the projection triangle with lines in the three-dimensional space, to form a pentahedron model;

wherein the five planes of the pentahedron model include: the measuring triangle located at an upper surface, the projection triangle located at a lower bottom surface, and two lateral triangles and a trapezoid that are obtained by connecting vertexes of the measuring triangle and the projection triangle; and obtaining side lengths of the projection triangle by geometric calculation, and calculating out a value of the projection angle corresponding to the first sound source estimated value according to the side lengths, thereby obtaining the second sound source estimated value.

8. The smart device according to claim 5, wherein according to the first sound source estimated value and the inclination angle, calculating out the second sound source estimated value on the horizontal, reference plane corresponding to the first sound source estimated value comprises:

according to the first sound source estimated value and the inclination angle, calculating in real time the second sound source estimated value;

or, according to the first sound source estimated value and preset inclination angles or angle ranges, constructing a correspondence relation database that records correspondence relations between the first sound source estimated value and the second sound source estimated value, and according to a matching result between the inclination angle acquired in real time and the preset inclination angles or angle ranges in the correspondence relation database, determining the second sound source estimated value corresponding to the first sound source estimated value at the matched preset inclination angle or within the matched angle range.

* * * * *